(12) United States Patent
Liu et al.

(10) Patent No.: US 9,926,211 B2
(45) Date of Patent: Mar. 27, 2018

(54) METHOD FOR TREATING OIL-CONTAINING AQUEOUS MIXTURES WITH CATION EXCHANGE RESIN

(71) Applicants: Rohm and Haas Company, Philadelphia, PA (US); Dow Global Technologies LLC, Midland, MI (US)

(72) Inventors: Gongyan Liu, Sichuan (CN); Xianrui Wang, Shanghai (CN); Zhaohui Yan, Shanghai (CN); Liu Yang, Shanghai (CN); Zheng Zhang, Shanghai (CN); Jianbo Zhou, Huzhou (CN)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 297 days.

(21) Appl. No.: 14/906,623

(22) PCT Filed: Jul. 8, 2014

(86) PCT No.: PCT/US2014/045637
§ 371 (c)(1),
(2) Date: Jan. 21, 2016

(87) PCT Pub. No.: WO2015/020746
PCT Pub. Date: Feb. 12, 2015

(65) Prior Publication Data
US 2016/0185625 A1   Jun. 30, 2016

(30) Foreign Application Priority Data
Aug. 6, 2013   (WO) ................ PCT/CN2013/080877

(51) Int. Cl.
*C02F 1/40*   (2006.01)
*C02F 1/42*   (2006.01)
(Continued)

(52) U.S. Cl.
CPC .............. *C02F 1/42* (2013.01); *B01D 17/045* (2013.01); *B01J 39/04* (2013.01); *C02F 1/40* (2013.01);
(Continued)

(58) Field of Classification Search
CPC . B01D 17/045; C02F 1/40; C02F 1/42; C02F 2001/425; C02F 2101/32; C02F 2101/325; C02F 2305/04; B01J 39/04
See application file for complete search history.

(56) References Cited

U.S. PATENT DOCUMENTS 3,800,944 A * 4/1974 Yost ..................... B01D 17/045
516/136
4,151,078 A    4/1979 Calvin
(Continued)

FOREIGN PATENT DOCUMENTS

| CN | 1478727 A | * 3/2004 |
| CN | 101298058 A | * 11/2008 |
| NO | 2006019367 | 2/2006 |

OTHER PUBLICATIONS

Machine Language Translation of CN 1478272A (Wang Yalin), Mar. 2004. Retreived from the internet on Jan. 19, 2018. Retreived from <URL: https://worldwide.espacenet.com/>.*
(Continued)

*Primary Examiner* — Matthew O Savage
(74) *Attorney, Agent, or Firm* — Edward W. Black

(57) ABSTRACT

A method for treating an oil-containing aqueous mixture comprising the step of passing the mixture (1) through a media (6) comprising a bead-form cation exchange resin combined with a cationic surfactant, wherein the resin includes a sulfonated crosslinked copolymer matrix having a rough surface characterized by having a frequency of at least 5 peaks and valleys per sample surface area (283

(Continued)

um×212 um), where the difference between the average height of the 5 highest peaks and the 5 lowest valleys is at least 6 μm.

9 Claims, 2 Drawing Sheets

(51) Int. Cl.
*B01D 17/04* (2006.01)
*B01J 39/04* (2017.01)
*C02F 101/32* (2006.01)

(52) U.S. Cl.
CPC .... *C02F 2001/425* (2013.01); *C02F 2101/32* (2013.01); *C02F 2101/325* (2013.01); *C02F 2305/04* (2013.01)

(56) References Cited

U.S. PATENT DOCUMENTS

| | | |
|---|---|---|
| 4,256,840 A | 3/1981 | Meitzner et al. |
| 4,500,652 A | 2/1985 | Misaka et al. |
| 5,244,926 A | 9/1993 | Harris et al. |
| 6,228,896 B1 | 5/2001 | Bachmann et al. |
| 6,750,259 B2 | 6/2004 | Dimotsis et al. |
| 6,784,213 B2 | 8/2004 | Rohrbach et al. |
| 8,436,055 B2 | 5/2013 | Terajima et al. |
| 8,765,825 B2 | 7/2014 | Fukui et al. |
| 8,975,340 B2 | 3/2015 | Yengoyan et al. |
| 2002/0002267 A1 | 1/2002 | Long |
| 2004/0006145 A1 | 1/2004 | Dimotsis et al. |
| 2005/0014853 A1 | 1/2005 | Tesch et al. |
| 2005/0070615 A1 | 3/2005 | Terajima et al. |
| 2009/0176131 A1 | 7/2009 | Goltz et al. |
| 2010/0130626 A1 | 5/2010 | Fukui et al. |
| 2012/0157556 A1 | 6/2012 | Yengoyan et al. |
| 2013/0109769 A1 | 5/2013 | Tsuzuki |

OTHER PUBLICATIONS

Machine Language Translation of CN 101298058 A (Xiaomeng Hu), Nov. 2008. Retreived from the internet on Jan. 19, 2018. Retreived from <URL: https://worldwide.espacenet.com/>.*
Zhou, Y.B., et al. Emulsified oily wastewater treatment using a hybrid modified resin and activated carbon system, Separation and Purification Technology (2008), 63, 400-406.
Zhou, Y.B., et al. Study on resin modified by quaternary ammonium salt for emulsified oil wastewater treatment, China Water & Wastewater (2008), 24, 60-63.
Zhou, Y.B., et al. Modified Resin Coalesce for Oil-in-Water Emulsion Treatment: Effect of Operating Conditions on Oil Removal Performance, Ind. Eng. Chem. Res. (2009), 48, 1660-1664.
Zhou, Y.B., et al., Effect of quaternary ammonium surfactant modification on oil removal capability of polystyrene resin, Separation and Purification Technology (2010), 75, 266-272.
Yang, B., et al., Wettability Study of Mineral Wastewater Treatment Filter Media, Chem. Eng. Process. (2007), 46, 975-981.
Latthe, S.S., et al., Recent Progress in Preparation of Superhydrophobic Surfaces: A Review, Journal of Surface Engineered Materials and Advanced Technology, (2012), 2, 76-94.
Search report from corresponding Chinese 2014800426089 application, dated Dec. 12, 2016.

* cited by examiner

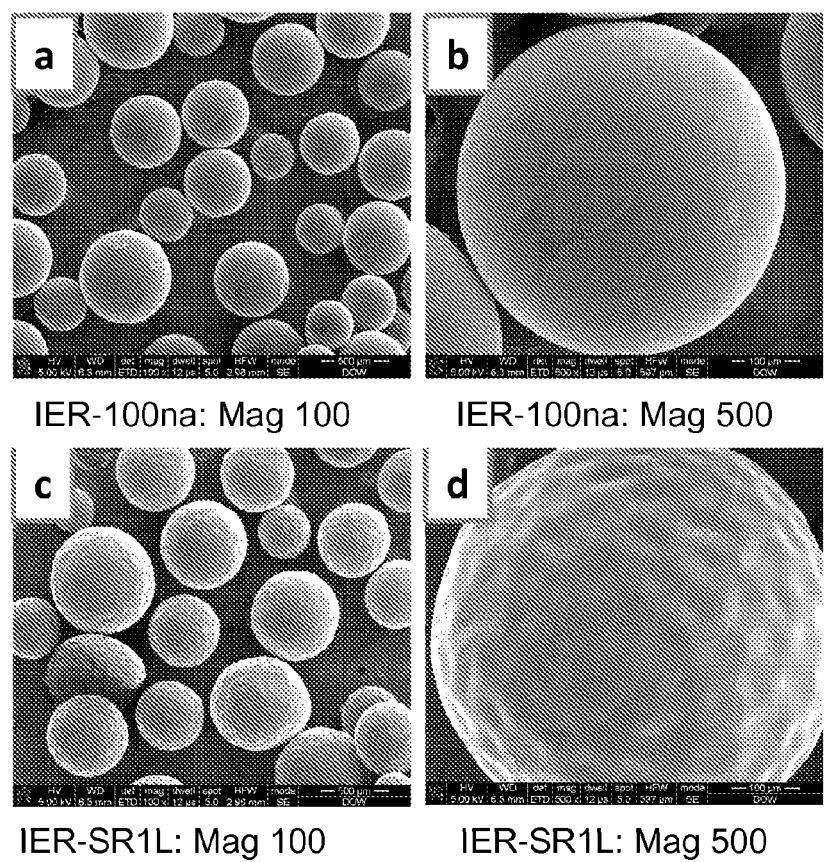
IER-100na: Mag 100
IER-100na: Mag 500
IER-SR1L: Mag 100
IER-SR1L: Mag 500
Fig. 2a-d

METHOD FOR TREATING OIL-CONTAINING AQUEOUS MIXTURES WITH CATION EXCHANGE RESIN

FIELD

The invention relates to methods for separating oil from aqueous mixtures using ion exchange media.

INTRODUCTION

Emulsified oily aqueous mixtures are produced in a wide variety of industrial processes including those used in the food, petroleum, petrochemical and metallurgical industries. Emulsified oil wastewater is hazardous for aquatic environments and generally requires treatment prior to disposal or re-use. One treatment approach described by Y. B. Zhou involves the use of coalescence; see: 1) Emulsified oil wastewater treatment using a hybrid modified resin and activated carbon system, Separation and Purification Technology (2008), 63, 400-406; 2) Study on resin modified by quaternary ammonium salt for emulsified oil wastewater treatment, China Water Wastewater (2008), 24, 60-63; 3) Modified resin coalesce for oil-in-water emulsion treatment: effect of operating conditions on oil removal performance, Ind. Eng. Chem. Res. (2009), 48, 1660-1664; 4) Effect of quaternary ammonium surfactant modification on oil removal capability of polystyrene resin, Separation and Purification Technology (2010), 75, 266-272. See also: B. W. Yang et al, 1) Wettability study of mineral wastewater treatment filter media, Chem. Eng. Process. (2007), 46, 975-981; and 2) Latthe, et al., Recent progress preparation of superhydrophobic surfaces: a review, Journal of Surface Engineered Materials and Advanced Technology, (2012), 2, 76-94. The industry continues to search for improved methods and media for removing oil from aqueous mixtures including industrial waste water.

SUMMARY

In one embodiment the invention includes a method for treating an oil-containing aqueous mixture by passing the mixture through a media including a bead-form cation exchange resin combined with a cationic surfactant. The resin includes a sulfonated crosslinked copolymer matrix with a rough surface characterized by having at least 5 peaks and valleys per sample surface area (283 um×212 um) where the difference between the average height of the 5 highest peaks and the 5 lowest valleys is at least 6 μm.

BRIEF DESCRIPTION OF THE DRAWINGS

FIGS. 2a-d are micrographs of bead-form cation exchange resins as described in the Example section.

DETAILED DESCRIPTION

Figure 1A:
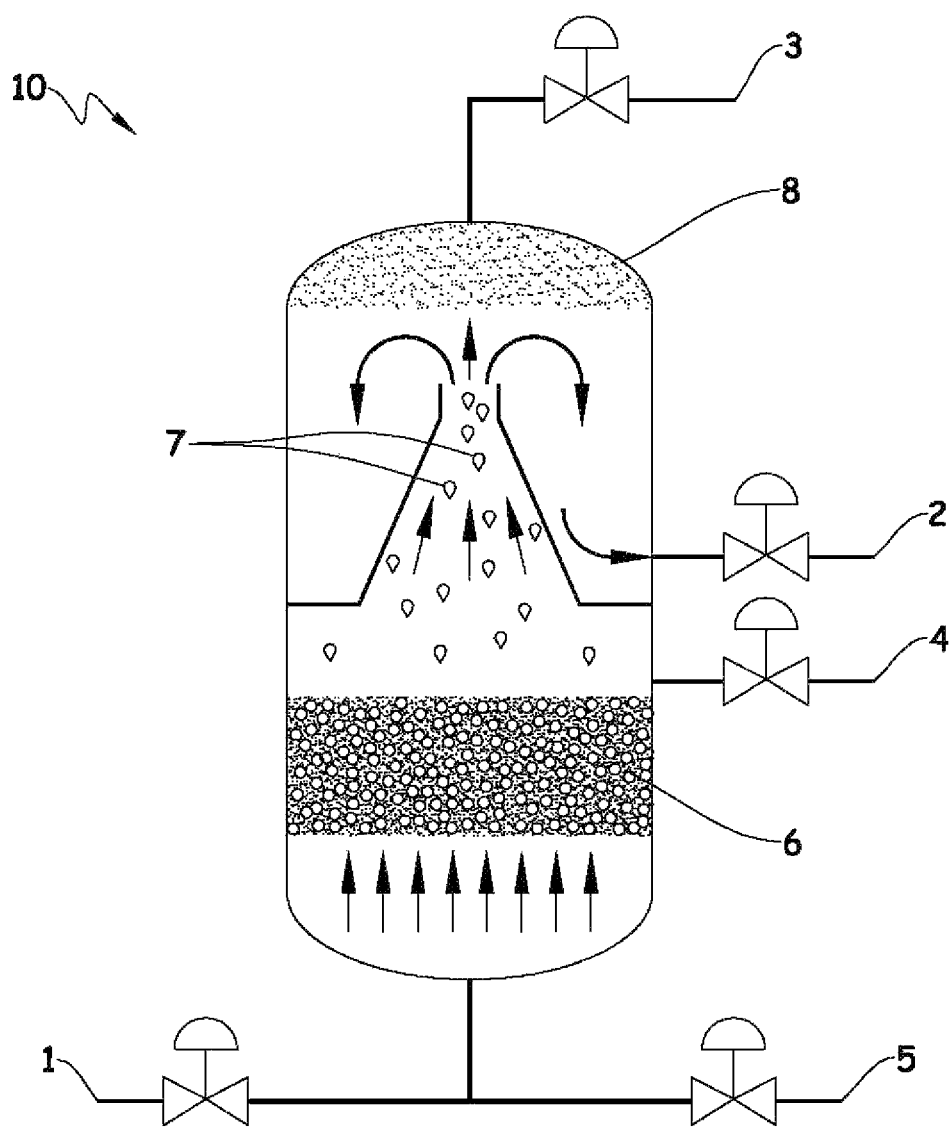
FIG. 1A is a schematic representation of a coalescer as used in the Examples.

The invention includes a method for separating oil from an aqueous mixture. Neither the type (e.g. mineral, organic) nor source (e.g. animal, vegetable, petrochemical) of oil is particularly limited. The invention finds particular utility in treating oil-containing aqueous mixtures generated or used in the food, petroleum, petrochemical and metallurgical industries.

In a preferred embodiment, the oil-containing aqueous mixture is passed through a media bed or column that serves as a coalescer. A schematic view of representative coalescer is generally shown at 10 in FIG. 1 including a tank equipped with an oily feed water intake (1), a treated water outlet (2), a recovered oil outlet (3), a wash water inlet (4), general outlet (5) and packed media section (6). In operation, an oil-containing aqueous feed mixture flows into the coalescer by way of intake (1) and passes through the media (6). As the feed mixture passes upward through the media (6), oil is adsorbed onto the media surface and progressively grows to form droplets (7). The oil droplets (7) float to the top of the coalescer to form an oil layer (8) which may be removed, e.g. by way of skimming. Treated liquid may be recovered at a point below the oil layer, e.g. by outlet (3). Alternative configurations and fluid flow patterns may also be used. The recovered water may be further treated, e.g. by way of filtration, passing through a bed of adsorbent (e.g. OPTIPORE L493 available from The Dow Chemical Co.), passing through another bed of ion exchange resin, etc.

The media includes a cation exchange resin provided in bead form. The resin preferably includes crosslinked copolymer matrix derived from polymerizing a monomer mixture including a monovinylidene monomer such as styrene and a crosslinker such as divinylbenzene, e.g. by suspension polymerization of a finely divided organic phase comprising styrene along with other optionally monovinylidene monomers, crosslinking monomers including divinylbenzene, a free-radical initiator and optionally a phase-separating diluent. While the crosslinked copolymer may be macroporous or gel-type, gel-type copolymers are preferred. The terms "gel-type" and "macroporous" are well-known in the art and generally describe the nature of the copolymer bead porosity. The term "macroporous" as commonly used in the art means that the copolymer has both macropores and mesopores. The terms "microporous," "gellular," "gel" and "gel-type" are synonyms that describe copolymer beads having pore sizes less than about 20 Angstroms Å, while macroporous copolymer beads have both mesopores of from about 20 Å to about 500 Å and macropores of greater than about 500 Å. Gel-type and macroporous copolymer beads, as well as their preparation are further described in U.S. Pat. No. 4,256,840 and U.S. Pat. No. 5,244,926—the entire contents of which are incorporated herein by reference. The crosslinked copolymer resin beads preferably have a median bead diameter from 100 to 2000 microns. The beads may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter.

Once formed, the crosslinked copolymer resin beads are sulfonated with a sulfonating agent, e.g. sulfuric acid, chlorosulfonic acid or sulfur trioxide. The sulfonation reaction is preferably conducted at elevated temperature, e.g. 100 to 150° C. without a solvent. An applicable sulfonation technique is described in US 2005/0014853. See also: U.S. Pat. Nos. 6,228,896, 6,750,259, 6,784,213, US 2002/002267 and US 2004/0006145. Sulfonation of the resin in the absence of a solvent is believed to impart a rough or dimpled surface to the resin bead. By way of illustration, FIGS. 1a-d are micrographs of two comparable ion exchange resins. The resin shown in FIGS. a) and b) was sulfonated using a traditional solvent (EDC) whereas the resin shown in FIGS. c) and d) was sulfonated in the absence of a solvent.

In a preferred embodiment, the surface of the resin is characterized by including a frequency of at least 5 (preferably at least 10) peaks and valleys per sample surface area (283 um×212 um). The difference between the average height of the 5 highest peaks and the 5 lowest valleys ($S_{10z}$ value) is preferably at least 6 μm, more preferably at least 8 μm and even more preferably at least 10 μm. In another embodiment, the resin has a surface area ratio ($S_{dr}$ value) of from 0.9% to 2.4%, wherein the "surface area ratio" refers to the increment of the interfacial surface area relative to an area of the projected (flat) x,y plane, (i.e. for a flat surface, the surface area of the x-y plane are the same and $S_{dr}$=0%). Surface characterization may be performed using a confocal laser scanning microscope (CLSM), preferably one using a scanning violet (408 nm) laser light source for high resolution confocal surface profiling. A preferred resin is AMBERLITE SR1L available from The Dow Chemical Company.

Once sulfonated, the resulting cation exchange resin is combined with a cationic surfactant. In a preferred embodiment the surfactant is loaded onto the resin by preparing an aqueous solution of the surfactant and passing the solution through a bed of the cation exchange resin. The resin may also be soaked in such a solution. The resin is preferably then rinsed with water prior to use. The surfactant is preferably loaded on the resin at ratio of 5% to 99% of the total exchange capacity of the resin, (i.e. the positively charged moiety of the surfactant associates with the negatively charged sulfonate functional groups of the cation exchange resin). The cationic surfactant includes a functional group selected from at least one of the following: i) an amine/ (primary, secondary or tertiary) and ii) a quaternary ammonium, iii) pyridinium, iv) quinoline, v) bis-quarternary ammonium, vi) sulfonium, vii) phosphonium and viii) arsonium. Applicable surfactants include those represented by the following formulae:

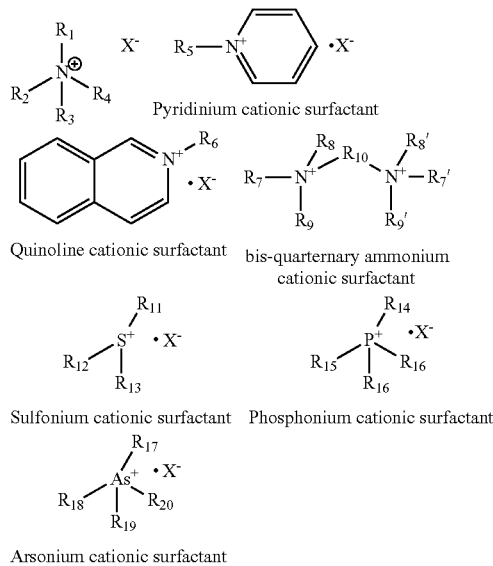

wherein X is selected from a halogen and $R_1$ through $R_{19}$ are independently selected from hydrogen and hydrocarbyls having from 1 to 20 carbon atoms with the proviso that at least one of $R_1$ through $R_{19}$ are independently hydrophobic moiety of alkyl, alkylarylalkyl, alkoxyalkyl, alkylaminoalkyl and alkylamidoalkyl, where alkyl represents the carbon chain length from a to b and which may branched or straight chain and which may be saturated or unsaturated. Preferred species including: dodecyl dimethyl benzyl ammonium bromide, hexadecyltrimethylammonium bromide, hexadecylpyridinium bromide, tetrabutylammonium bromide and cetyltrimethyl-ammonium bromide.

EXAMPLES

To better illustrate the invention, two test runs were completed using the same oily feed mixture, coalescer and operating conditions but using two different cation exchange resins. In both test runs, the resins were combined with the same cationic surfactant according to the same methodology. The experimental set up is schematically illustrated in FIG. 1.

Coalescer: 1600 ml resin packing volume
Feed mixture: 140 mg/L of oil at pH of approx. 3 and a temp. of approx. 36° C.
Operating conditions: Volumetric flow rate of 8 BV/h
Cationic surfactant: Dodecyl dimethyl benzyl ammonium bromide
Resin of Test Run 1: AMBERLITE 120 Na
Resin of Test Run 1: AMBERLITE SR1L The first test run was conducted using AMBERLITE 120 Na brand cation exchange resin available from The Dow Chemical Company. This resin has a crosslinked, styrene-divinylbenzene copolymer matrix that has been sulfonated with $H_2SO_4$ using a solvent (ethylene dichloride). The second test run was conducted using AMBERLITE SR1L brand cation exchange resin also available from The Dow Chemical Company. This resin is substantially similar to AMBERLITE 120 Na; however, this resin was sulfonated using $H_2SO_4$ without solvent. The surfaces of both cation exchange resins were analyzed (prior to loading with cationic surfactant) with a confocal laser scanning microscope (CLSM) using a scanning violet laser (408 nm) light source for high resolution confocal surface profiling. Combined with an additional white light source, the system provided simultaneous color, laser intensity, and height information to generate high-resolution images. The CLSM was operated with a 1 nm z-resolution and 130 nm spatial resolution providing SEM-like images with a large 7 mm through focus range. FIGS. 1a) and b) are micrographs of AMBERLITE 120 Na and FIGS. 1c) and d) are micrographs of AMBERLITE SR1L.

During each test run, treated water samples were collected at regular intervals and residual oil concentrations were determined using UV spectroscopy. The oil removal rate of the second test run increased over 20% from the first test run. Such higher oil removal rates permit greater flexibility in coalescer design and use of higher flow rates along with provided more options for further downstream treatment.

The invention claimed is:

1. A method for treating an oil-containing aqueous mixture comprising the step of passing the mixture through a media comprising a bead-form cation exchange resin combined with a cationic surfactant, wherein the resin comprises a sulfonated crosslinked copolymer matrix having a rough surface characterized by comprising a frequency of at least 5 peaks and valleys per sample surface area (283 um×212 um), where the difference between the average height of the 5 highest peaks and the 5 lowest valleys is at least 6 μm.

2. The method of claim 1 wherein the surface of the resin in characterized by comprising a frequency of at least 10 peaks and valleys per sample surface area (283 um×212 um).

3. The method of claim 1 wherein the cation exchange resin has a surface area ratio of from 0.9% to 2.4%.

4. The method of claim 1 wherein the resin is a gel-type.

5. The method of claim 1 wherein the crosslinked copolymer matrix is derived from polymerizing a monomer mixture comprising styrene or divinylbenzene.

6. The method of claim 1 wherein the cationic surfactant comprises a functional group selected from at least one of the following: i) an amine and ii) a quaternary ammonium iii) pyridinium, iv) quinoline, v) bis-quarternary ammonium, vi) sulfonium, vii) phosphonium and viii) arsonium.

7. The method of claim 1 wherein the cationic surfactant is represented by the formula:

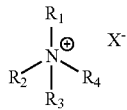

wherein X is selected from a halogen and $R_1$, $R_2$, $R_3$ and $R_4$ are independently selected from hydrogen and hydrocarbyls having from 1 to 20 carbon atoms with the proviso that at least one of $R_1$, $R_2$, $R_3$ and $R_4$ is a hydrocarbyl.

8. The method of claim 1 wherein the resin comprises a sulfonated crosslinked copolymer matrix having a rough surface characterized by comprising a frequency of at least 5 peaks and valleys per sample surface area (283 um×212 um), where the difference between the average height of the 5 highest peaks and the 5 lowest valleys is at least 8 μm.

9. The method of claim 1 wherein the resin comprises a sulfonated crosslinked copolymer matrix having a rough surface characterized by comprising a frequency of at least 5 peaks and valleys per sample surface area (283 um×212 um), where the difference between the average height of the 5 highest peaks and the 5 lowest valleys is at least 10 μm.

* * * * *